United States Patent [19]

Sakurada et al.

[11] 4,029,421
[45] June 14, 1977

[54] DIGITAL EXPOSURE METER

[75] Inventors: Nobuaki Sakurada, Yokohama; Nobuhiko Shinoda; Yukio Mashimo, both of Tokyo; Tadashi Ito; Fumio Ito, both of Yokohama, all of Japan

[73] Assignee: Canon Kabushiki Kaisha, Tokyo, Japan

[22] Filed: Oct. 16, 1975

[21] Appl. No.: 622,834

[30] Foreign Application Priority Data

Oct. 17, 1974 Japan .............................. 49-119802

[52] U.S. Cl. .............................. 356/223; 354/23 D; 354/24; 356/226
[51] Int. Cl.² ....................... G01J 1/42; G03B 7/08
[58] Field of Search ......... 356/223, 226; 354/23 D, 354/24

[56] References Cited

UNITED STATES PATENTS 3,670,637  6/1972  Mori et al. .......................... 356/223
3,909,137  9/1975  Kisanuki .............................. 356/223

Primary Examiner—John K. Corbin
Assistant Examiner—Stewart Levy
Attorney, Agent, or Firm—Toren, McGeady and Stanger

[57] ABSTRACT

This invention relates to a digital exposure meter in which brightness information is digitized and exposure factors such as film sensitivity are converted to digital values to perform digital computation. Accordingly, an exposure value, average exposure value, aperture value or shutter time is derived while a computer having various operation functions being controlled in sequence by sequence control means.

9 Claims, 13 Drawing Figures

COD RG

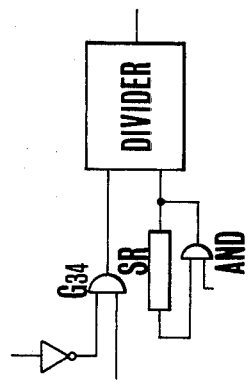
F I G.12
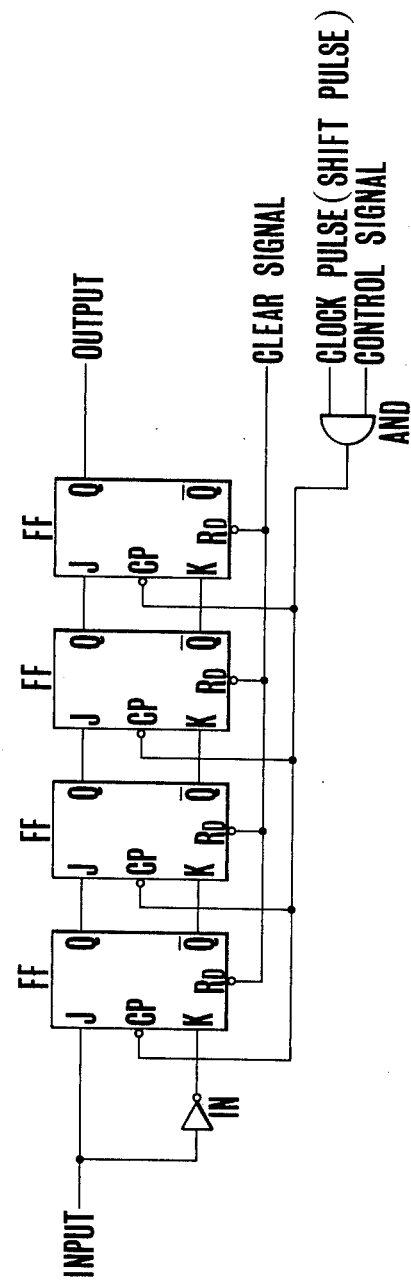
F I G.13

DIGITAL EXPOSURE METER

BACKGROUND OF THE INVENTION

1. Field of the Invention

This invention relates to exposure meters for use with photographic cameras, and, more particularly, to a digital exposure meter in which analog quantities are converted to corresponding digital quantities based on which a proper exposure value is derived by computation.

2. Description of the Prior Art

The prior art provides many methods of deriving exposure values for use in photography, most of which may be grouped into the following three types:

1. Derivation of an effective exposure aperture for the photographic lens as a result of computation from the object brightness, film sensitivity and shutter speed;

2. Derivation of an effective exposure time as a result of computation from the object brightness, film sensitivity and aperture value of the photographic lens;

3. Derivation of an exposure value for a given photographic situation as a result of computation from the object brightness and film sensitivity.

All of these types have respective characteristics and advantages, and have so far been put into practice, but with some drawbacks.

The method of type (1) described above because of its possibility of preselection of a desired shutter speed, permits the photographer who encounters a given photographic situation associated with a high possibility of introducing vibrations into the hand-held camera, when snap photography is to be made, or when an object which is moving at a high speed is included therein, or when a telephoto objective lens is used with the camera, to take into account the movement of the object and the magnitude of the vibrations. This is done so as to select a relatively faster shutter speed but does not enable him to observe and evaluate in detail the far limit and the near limit of the depth of the total scene prior to making an exposure, because the effective exposure aperture is automatically determined with the preselected shutter speed. Therefore, this first type is not suitable for use in taking a picture of landscape or still life of which the quality is largely dependent upon adjustment of the depth of field, or taking a vignette by making use of the controlled depth of field.

The method of type (2) described above operates in an entirely opposite sense to that of the type (1) method, permitting for the photographer who is about to take a picture of landscape or still life, or to take a vignette, to adjust the size of diaphragm aperture by taking into account the depth of field, but will result in a reduction of the percentage of photographs taken with relatively long shutter speeds which will be found acceptable particularly when the given photographic situation includes an object which is moving at a relatively high speed, or when the camera is hand-held. Therefore, this second type is not suitable for use in taking a picture of an object being moved at a fast speed, or taking picture while the camera is being held by hand.

The method of type (3) described above provides an exposure value which when used in making an actual exposure must be factored into effective exposure time and aperture based on his personal experience and insight.

Accordingly, it is desirable to provide an exposure meter capable of selectively performing either of the methods of types (1) and (2) by the free choice of the photographer as the controls of shutter speed and aperture value have different imaging effects from each other. With this in mind, an analog exposure meter has been proposed which is provided with a function of deriving an effective exposure aperture in automatic response to the sensitivity of the used film, the preselected shutter speed and the level of brightness of an object being photographed, and with a function of deriving an effective exposure time in automatic response to the sensitivity of the used film, the preselected aperture and the object brightness level. This analog exposure meter necessitates an electrical circuit for processing photographic information in the analog form to compute an exposure value, thereby giving a disadvantage of making it practically impossible to manufacture a production run of circuit elements thereof economically while holding all of the circuit parameters to specific and ideal values.

In connection with the method of type (3), there are two metering modes, namely, a spot-metering mode and an overall field of view light metering mode. The spot-metering mode when applied to an exposure determination for that portion of a scene being photographed which constitutes a subject of principal interest provides a correct exposure as the environment of the subject is of no importance. But, when the area of the image within the spot of the subject of principal interest is larger than the area of the spot based on which the exposure determination is made, it is generally impossible to make a correct exposure for the entire area of the subject. The overall field of view light metering mode works in an entirely opposite sense to that of the spot-metering mode. It is known in the art to provide a camera of which light metering aspects may be selectively operated in a spot-metering mode or overall field of view light metering mode. In this case, it is also necessary to process photographic information in the analog form to compute an exposure value. Accordingly, likewise as above, the computing circuit is made complicated in structure, and a requirement for high accuracy of light metering is not satisfied.

SUMMARY OF THE INVENTION

Accordingly, the present invention has, for the general object, to provide an exposure meter for a photographic camera of which exposure value deriving aspects may be selectively operated in a shutter speed preselection automatic aperture value deriving mode, or aperture value preselection automatic shutter time deriving mode, and of which light metering aspects may be selectively operated in a spot-metering mode or overall field of view light metering mode.

An object of the invention is to provide an exposure meter which is constructed from a digital computer of which various electrical circuits may be fabricated in an integrated circuit form and which has overcome the above mentioned conventional drawbacks thereby.

Another object of the invention is to provide a digital exposure meter capable of computing an average exposure value from a number of particular exposure values based on corresponding portions of the area of an image of the total scene.

Another object of the invention is to provide a digital exposure meter which permits for a photographer to make an exposure determination with a desired shutter speed or aperture value based on the portion of the image within a particular spot or on the total image selectively.

Other objects and features of the invention will become apparent from the following detailed description taken in conjunction with the accompanying drawings.

BRIEF DESCRIPTION OF THE DRAWINGS

FIG. 12 is a schematic circuit diagram of a reciprocal number circuit 6 of FIG. 1.

FIG. 13 is a schematic circuit diagram of a shift register usable in the circuit of FIG. 1.

DESCRIPTION OF THE PREFERRED EMBODIMENT

Figure 1:
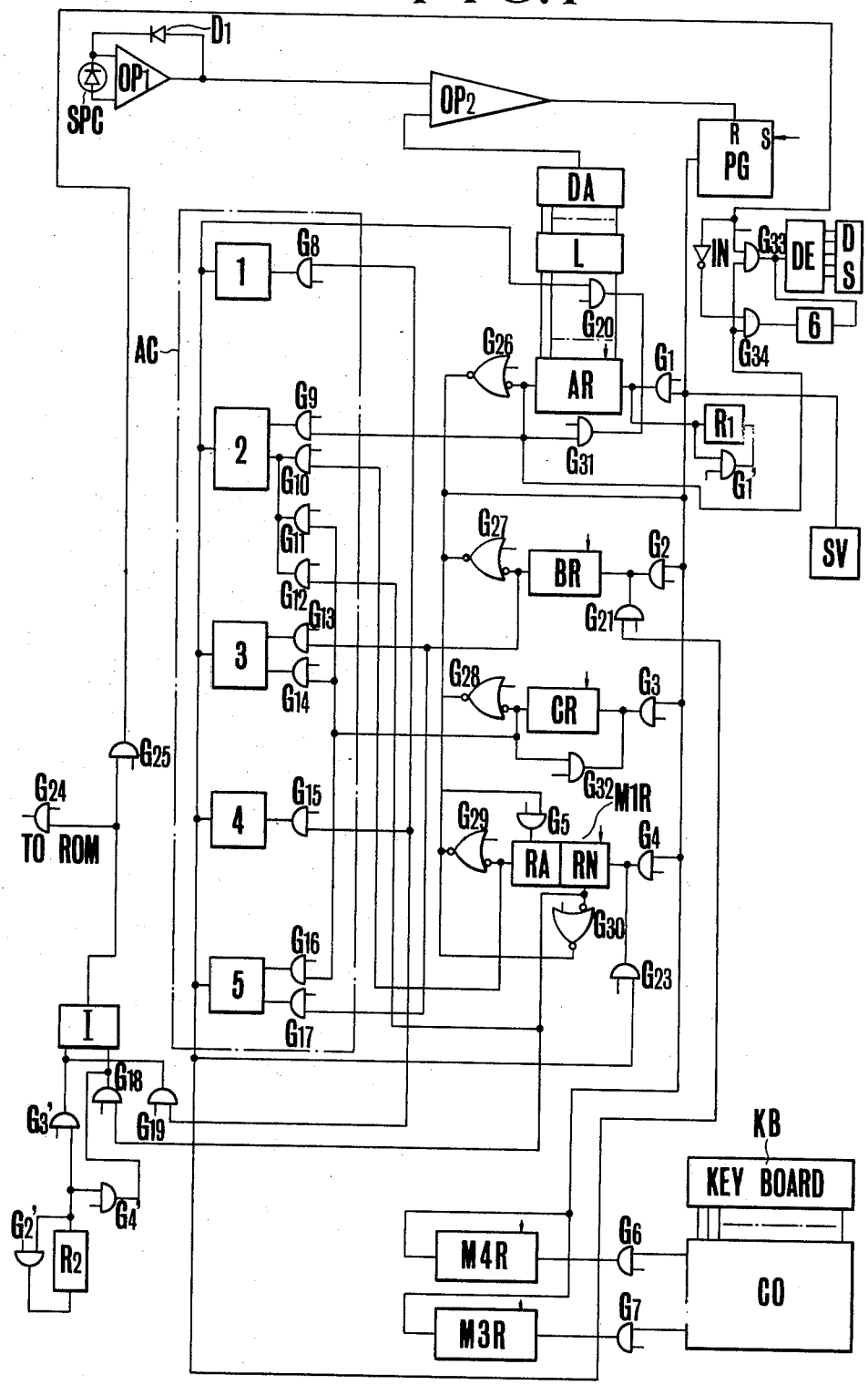
FIG. 1 is a schematic view, partially in block form, of the circuitry of a digital exposure meter according to the present invention.
Figure 3:
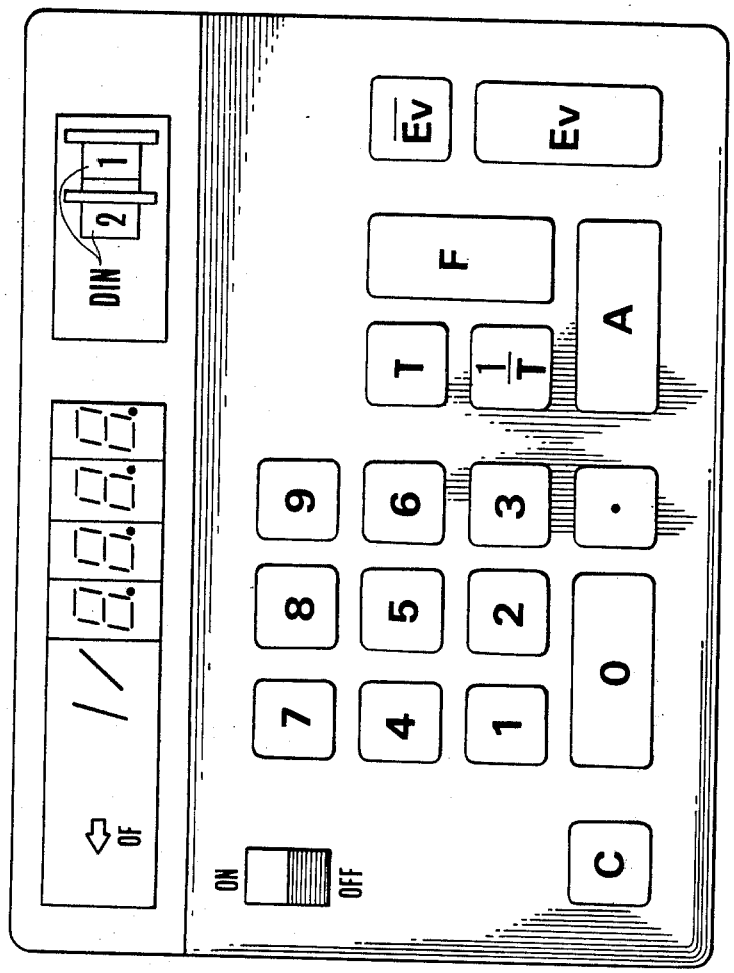
FIG. 3 is a top view of the digital exposure meter of FIG. 1 having a number of keys.
Figure 4:
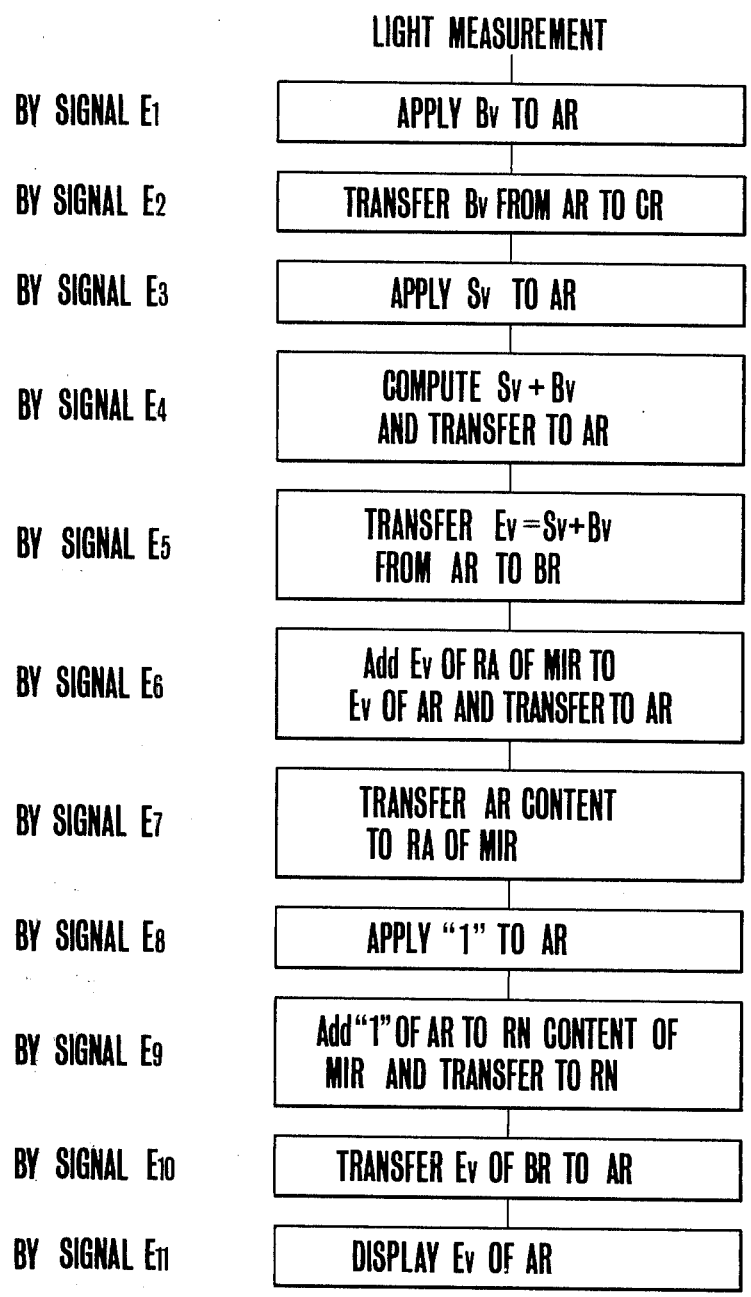
FIG. 4 is a block diagram showing a program incorporated in the ROM device of FIG. 2 for light measurement.

Referring now to FIG. 1, there is shown one embodiment of a digital exposure meter according to the present invention as comprising a sensor circuit having a photosensitive element SPC connected between two inputs terminals of an operational amplifier $OP_1$ and having a log diode $D_1$ connected in the feedback network of operational amplifier $OP_1$, a comparator $OP_2$ having two input terminals one of which is connected to the output terminal of amplifier $OP_1$ and the other of which is connected to an output terminal of a digital-to-analog converter DA and having an output connected to a "reset" input terminal R of a clock pulse generator PG, a latch circuit L connected between digital-to-analog converter DA and a first shift register AR having an input terminal connected to a common output terminal of clock pulse generator PG through an AND gate $G_1$, second and third shift registers BR and CR, the second shift register BR having an input terminal connected both to the common output terminal of a computing circuit AC through an AND gate $G_{21}$, and the third shift register CR having an input terminal connected through an AND gate $G_3$ to the common output terminal of clock pulse generator PG, a first memory register M1R having two parts RA and RN with the input terminals thereof being connected through respective AND gates $G_5$ and $G_4$ to the common output terminal of clock pulse generator PG, second and third memory registers M4R and M3R having input terminals connected through respective AND gates $G_6$ and $G_7$ to a control parameter input circuit CO associated with a key board of FIG. 3, a display device having a decoder DE made of a diode matrix and having a number of display elements such as seven segments DS and having a reciprocal number circuit 6, the decoder DE having an input terminal connected both to the output terminal of first shift register AR through an AND gate $G_{33}$ and to the output terminal of reciprocal number circuit 6, and the reciprocal number circuit 6 having an input terminal connected through an AND gate $G_{34}$ to the output terminal of first shift register AR, a film speed Sv having an output terminal connected through gate $G_1$ to the input terminal of first shift register AR, and a discriminating circuit I having two input terminals one of which is connected through an AND gate $G_{19}$ to the output terminal of first shift register AR and the other of which is connected through an AND gate $G_{18}$ to an output terminal of part RN of first memory register M1R, and having an output terminal connected both to the gating control input terminal of gate $G_{33}$ through an AND gate $G_{25}$ and to an input terminal of a read-only-memory device ROM through an AND gate $G_{24}$.

The computing circuit AC comprises a square-root circuit 1 having an input terminal connected through an AND gate $G_8$ to the output of first shift register AR, an adder 2 having two input terminals one of which is connected through an AND gate $G_9$ to the output terminal of first shift register AR, and the other of which is connected to the output terminals of third shift register CR, parts RA and RN of first memory register M1R through respective AND gates $G_{11}$, $G_{10}$ and $G_{12}$, a divider 3 having two input terminals connected to the respective output terminals of second and third shift registers BR and CR through respective AND gates $G_{13}$ and $G_{14}$, an exponent circuit 4 having an input terminal connected through an AND gate $G_{15}$ to the output terminal of first shift register AR, and a multiplier 5 having two input terminals connected to the respective output terminals of second and third shift registers BR and CR through respective AND gates $G_{17}$ and $G_{16}$, the parts 1 through 5 having a common output terminal connected to the input terminal of first shift register AR through an AND gate $G_{20}$, and to the output terminal of second shift register BR through AND gate $G_{21}$ and to the input terminal of part RN of first memory register M1R through an AND gate $G_{23}$.

The output terminals of first, second and third shift registers AR, BR and CR and two parts RA and RN of first memory register M1R are connected through respective inhibit AND gates $G_{26}$ through $G_{30}$ to both of the input terminals of AND gates $G_1$ and $G_5$ and therefrom to the input terminal of first shift register AR and to the part RA of first memory register M1R respectively. First shift register AR is further provided with an AND gate $G_{34}$ connected between the input and output terminals thereof and with a shift register $R_1$ having an output terminal connected to the input terminal of register AR, and having an AND gate $G_1'$ connected between the input and output terminals of register $R_1$. The third shift register CR is further provided with an AND gate $G_{32}$ connected between the input and output terminals thereof. The discriminating circuit I is further provided with a shift register $R_2$ having an AND gate $G_2'$ connected between the input and output terminals of register $R_2$ and having an output terminal connected through to the respective input terminals of discriminating circuit I through AND gates $G_3'$ and $G_4'$. The output terminal of discriminating circuit is connected through AND gate $G_{25}$ and an inverter IN to the gating control input terminal of AND gate $G_{34}$ having an output terminal connected to the input terminal of reciprocal number circuit 6.

Figure 2:
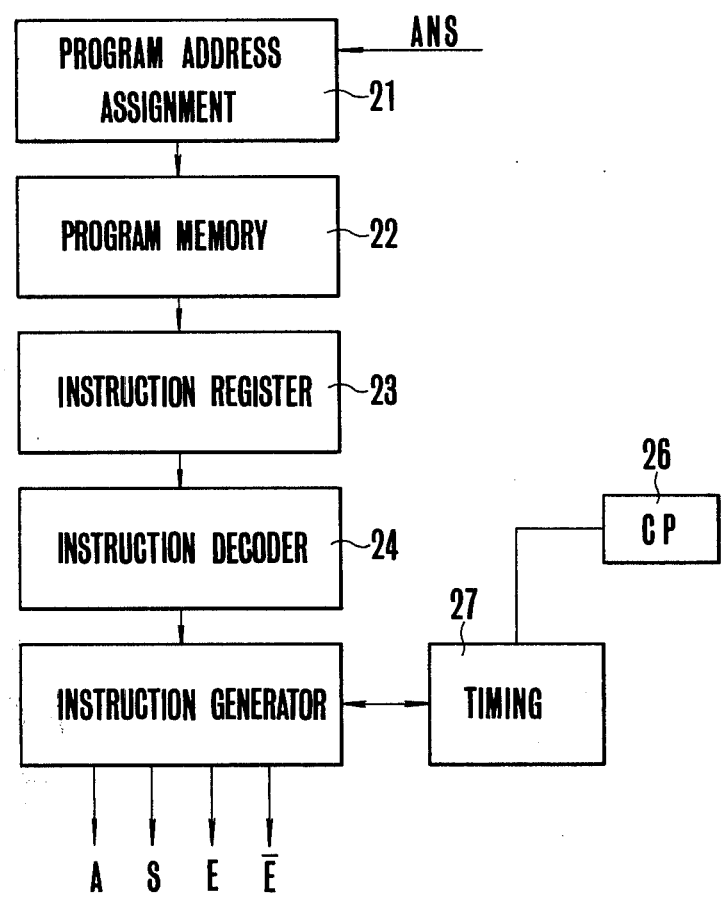
FIG. 2 is a block diagram of a ROM device usable in the digital exposure meter of FIG. 1.

The gating control input terminals of all of the gates $G_1$ through $G_{32}$ and $G_1'$ through $G_4'$ are connected to output terminals of the ROM device of FIG. 2, so that a number of control signals are sequentially applied from the ROM device to those of the gating control input terminals which are selected according to the selected one of the programs illustrated in FIGS. 4, 5, 6 and 9. The selection of the programs and the introduction of exposure control parameter values into the exposure meter can be effected on the key board of FIG. 3, in which keys designated by digit characters 0 through 9 and point are adapted for introducing a value of a desired shutter speed, or aperture value, keys designated by T and 1/T for setting the shutter speed, a key designated by F for setting the aperture value, a key designated by $\overline{Ev}$ for selecting the light measurement program of FIG. 4, a key designated by Ev for selecting the average light measurement program of FIG. 5, a key designated by A for selecting either the shutter time computation program of FIG. 6 or the aperture value computation program of FIG. 9, and a digital switch designated by DIN for setting the film speed, and DS designates the read-out device of FIG. 1.

The operation of the digital exposure meter of FIGS. 1, 2 and 3 will be described in connection with FIGS. 4, 5, 6 and 9. For making an exposure value determination based on the program of FIG. 4, the operator may push down Ev key, thereby the program address assigning circuit 21 of FIG. 2 is actuated causing the program memory 22 to render the program of FIG. 4 cooperative with the instruction register 23 which in turn causes generation of eleven pulses $E_1$ through $E_{11}$ in sequence through the instruction decoder 24 and instruction generator 25.

First signal $E_1$ is applied to first shift register AR, clock pulse generator PG, gates $G_1$ and $G_{26}$, thereby register AR and generator PG are rendered operative and gates $G_1$ and $G_{26}$ are gated on and off respectively. As generator PG produces a clock pulse train which is passed through gate $G_1$ to register AR, the register AR counts the number of pulses produced and stores in the form of a time variable binary code, that is, the binary condition 1 or 0 in each of the bits of register AR. The number of pulses counted by register AR is converted to a corresponding voltage by digital-to-analog converter DA having a ladder type resistor network known in the art. When the output voltage of converter DA has reached a level equal to the output voltage of the sensor which is proportional to the logarithm of the object brightness level, comparator $OP_2$ produces an output signal which is applied to the reset input of clock pulse generator PG, thereby generator PG is rendered inoperative. During the time interval the clock pulse train enters register AR, gate $G_{26}$ is gated off to prevent the output of register AR from exiting therefrom to the other registers. Second signal $E_2$ is applied to first and third shift registers AR and CR and gates $G_3$ and $G_{28}$, causing the content of first register AR to be shifted and to be transferred through gate $G_{26}$ and gated-on gate $G_3$ to third shift register CR. Third signal $E_3$ is applied to first register AR and gates $G_1$ and $G_{26}$, causing a digital output of film speed setter Sv to be transmitted into first register AR through gate $G_1$. Fourth signal $E_4$ is applied to first and third shift registers AR and CR and gates $G_{26}$, $G_{28}$, $G_9$, $G_{11}$ and $G_{20}$, causing the outputs of first and third shift registers AR and CR to be transmitted through gates $G_9$ and $G_{11}$ to adder 2 and causing the output of adder 2 which is representative of $Bv + Sv$ to be transmitted through gate $G_{20}$ to first shift register AR. During this time interval, gates $G_{26}$ and $G_{28}$ are gated off to insure that the outputs of first and second shift registers AR and CR are applied to only adder 2. Fifth signal $E_5$ is applied to first and second shift registers AR and BR and gates $G_2$, $G_{27}$ and $G_{31}$, causing the AR content $Bv + Sv = Ev$ to be transferred to second shift register BR through gates $G_{26}$ and $G_2$, and causing AR content to be again introduced to first register AR through gate $G_{31}$. Sixth signal $E_6$ is applied to RA part of first memory register M1R, first shift register AR, and gates $G_{26}$, $G_{29}$, $G_{10}$, $G_9$ and $G_{20}$, causing the output of RA part of first memory register M1R and first shift register AR to be applied to adder 2 through gates $G_9$ and $G_{10}$ and causing the output of adder 2 to be applied to first shift register AR through gate $G_{20}$. Seventh signal $E_7$ is applied to first shift register AR, RA part of first memory register M1R and gates $G_5$ and $G_{29}$, causing the content of first shift register AR to be transferred through gate $G_5$ to RA part of first memory register M1R. As a result from signals $E_1$ through $E_7$, the value $Ev$ $(=Bv+Sv)$ of first shift register AR is added to the sum of a number of values $Ev$'s previously stored in RA part of first memory register M1R and equal to the number of light measurements repeated. It is not assumed that the number of light measurements repeated is zero, in other words, this light measurement is of the first time. Eighth signal $E_8$ is applied to register $R_1$ which stores a digital value corresponding to 1 of first shift register AR, and gates $G_{26}$ and $G_1'$, causing the content of register $R_1$ to be transferred to first shift register AR, and causing the content of register $R_1$ to be again introduced thereto through gate $G_1'$. Ninth signal $E_9$ is applied to first shift register AR, RN part of first memory register M1R, and gates $G_9$, $G_{12}$, $G_{23}$, $G_{26}$ and $G_{30}$, causing the outputs of first shift register AR and RN parts to be applied through gates $G_9$ and $G_{12}$ to adder 2, and causing the output of adder 2 to be applied to RN part through gate $G_{23}$. As a result from signals $E_8$ and $E_9$, the number of light measurements repeated and stored in RN part of first memory register M1R is increased by one. But this light measurement is of the first time, so that the RN part has a binary condition 1. Tenth signal $E_{10}$ is applied to first and second shift registers AR and BR and gate $G_1$ and $G_{26}$, causing the content of second shift register BR to be transferred through gate $G_1$ to first shift register AR, that is, the transfer of value Ev from second to first shift register. Eleventh signal $E_{11}$ is applied to first shift register AR and gates $G_{26}$, $G_{31}$ and $G_{33}$ causing the value Ev of first shift register AR to be displayed by the display device DS through gate $G_{33}$ and decoder driver DE and causing the value Ev to be again introduced into AR.

Figure 5:
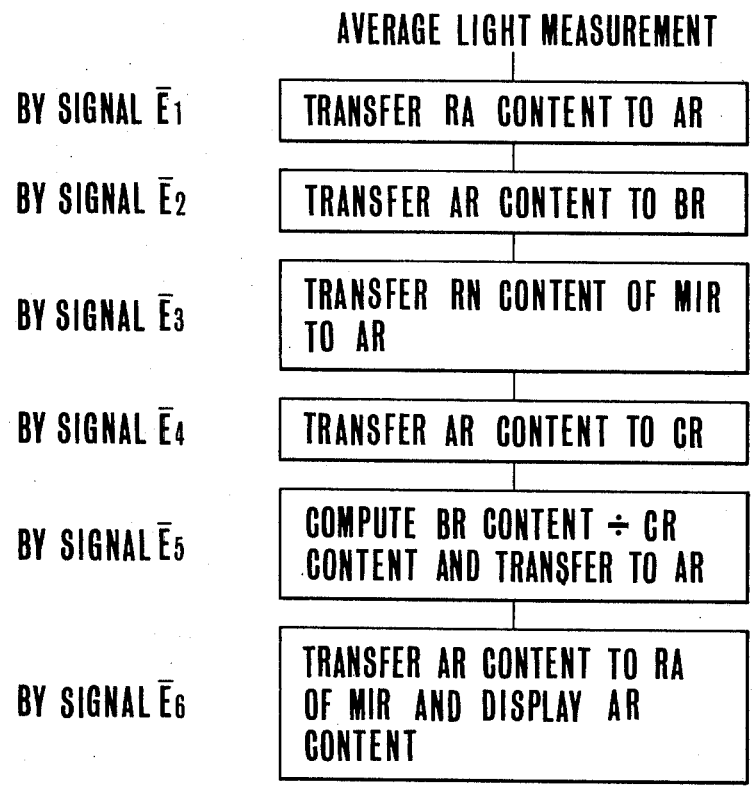
FIG. 5 is a block diagram showing a program incorporated in the ROM device of FIG. 2 for average light measurement.
Figure 6:
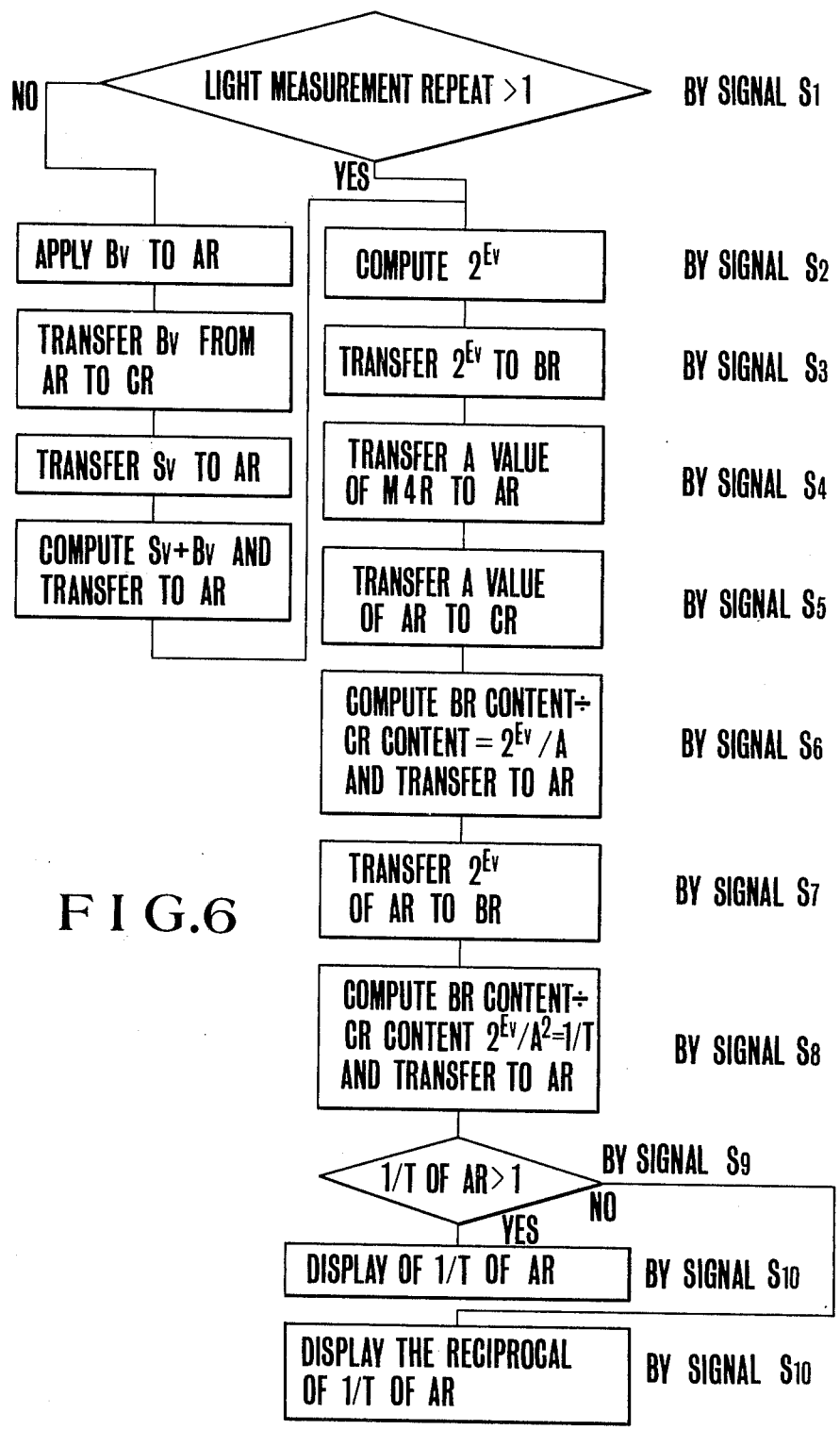
FIG. 6 is a block diagram showing a program incorporated in the ROM device of FIG. 2 for shutter time computation.

For making an exposure value determination based on the program of FIG. 5, $\overline{Ev}$ key is pushed down to select the program of FIG. 5 for cooperation with the ROM device of FIG. 2. First signal $\overline{E_1}$ is applied from ROM device to first shift register AR, RA part of first memory register M1R and gate $G_1$ and gate $G_{26}$, causing the content of RA to be transferred to AR through gate $G_1$. Second signal $\overline{E_2}$ is applied to first and second shift registers AR and BR, gates $G_2$ and $G_{27}$, causing the content of AR to be transferred to BR through gate $G_2$. As a result from signals $\overline{E_1}$ and $\overline{E_2}$, the sum of values $Ev$'s stored in RA part is transferred to BR. Third signal $\overline{E_3}$ is applied to first shift register AR, RN part of first memory register M1R and gates $G_1$ and $G_{26}$, causing the content of RN part to be transferred to AR through gate $G_{30}$ and $G_1$. Fourth signal $\overline{E_4}$ is applied to first and third shift registers AR and CR and gates $G_3$ and $G_{28}$, causing the content of AR to be transferred through gates $G_{26}$ and $G_3$ to third register CR. As a result from signal $\overline{E_3}$ and $\overline{E_4}$, the number of light measurements repeated and stored in RN part is transferred to CR. Fifth signal $\overline{E_5}$ is applied to first, second and third shift registers AR, BR and CR and gates $G_{13}$, $G_{14}$, $G_{20}$, $G_{26}$, $G_{27}$ and $G_{28}$, causing the outputs of second and third shift registers BR and CR to be applied through gates $G_{13}$ and $G_{14}$ to divider 3, and causing the output of divider 3 to be applied through gate $G_{20}$ to AR. The output of divider 3 is representative of an average value of the number of values $Ev$'s. Sixth signal $\overline{E_6}$ is applied to first shift register AR, RA part of first memory register M1R and gates $G_5$, $G_{29}$, $G_{31}$ and $G_{33}$, causing the content of AR to be transferred to RA part of M1R through gates $G_{26}$ and $G_3$, and causing the average value $\overline{Ev}$ to be displayed by display device DS through gate $G_{33}$ and decoder driver DE, and further causing the content of AR to be again introduced to AR, thereby the procedure of the average light measurement program of FIG. 5 is terminated.

Figure 7:
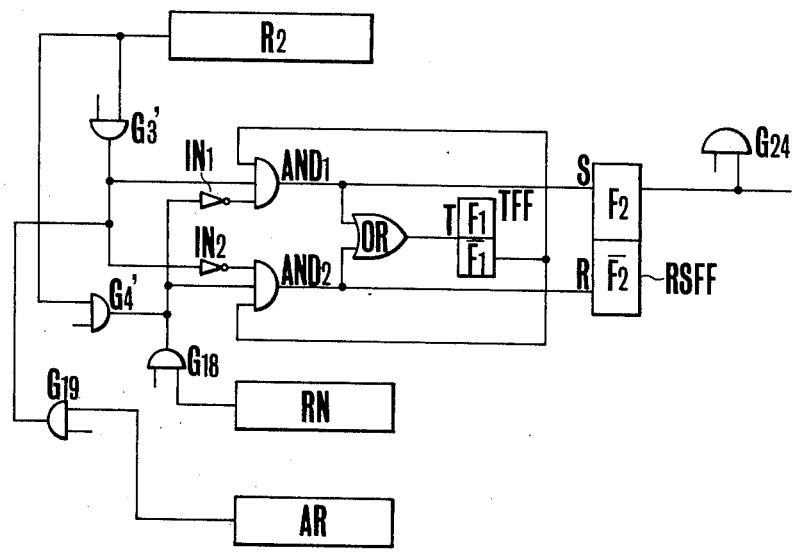
FIG. 7 is a schematic circuit diagram, partially in block form, of a discriminating circuit usable in the circuit of FIG. 1.
Figure 8:
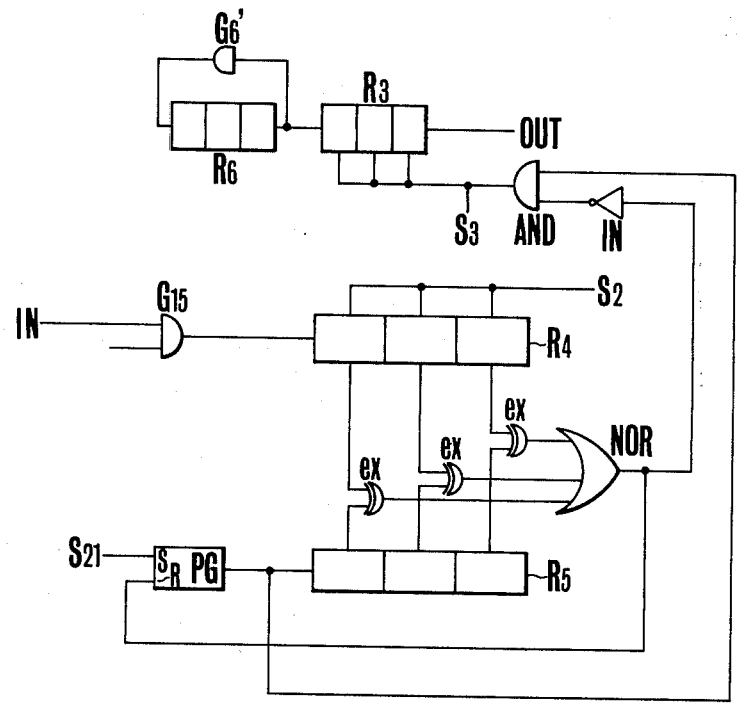
FIG. 8 is a schematic circuit diagram, partially in block form, of an exponent circuit usable in the circuit of FIG. 1.
Figure 9:
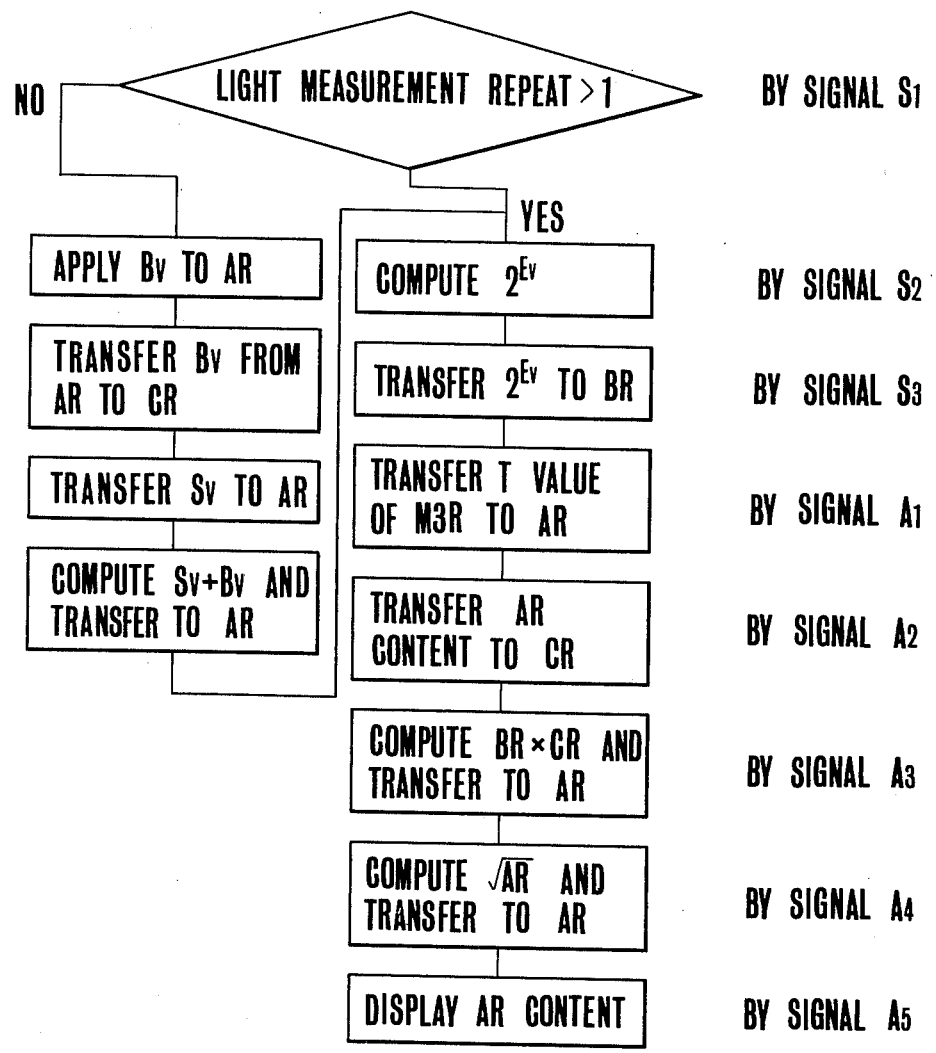
FIG. 9 is a block diagram showing a program incorporated in the ROM device of FIG. 2 for aperture value computation.

For making an exposure time determination, a desired aperture value is set into the meter by pushing down certain of digit keys 0 through 9 and a decimal point key of FIG. 3, thereby the setting of the desired aperture value, A-value, is converted by input circuit CO known in the art to a corresponding digital value. Next key F is pushed down to apply a gating control signal to gate $G_6$, thereby the A-value is introduced into and stored in second memory register M4R. Next key A is pushed down to select the shutter time computation program of FIG. 6 for cooperation with ROM device. First signal $S_1$ is applied to RN part of first memory register M1R, register $R_2$ which stores a digital value corresponding to 1, and gates $G_{18}$, $G_{24}$, $G_{30}$, $G_2'$ and $G_3'$, causing the output of RN party of M1R and the output of register $R_2$ to be applied to discriminating circuit I. When the output of RN part is smaller than that of register $R_2$, in other words, when the number of light measurements repeated is zero, discriminating circuit I produces an output signal which is applied through gate $G_{24}$ to ROM device, thereby signals $E_1$ through $E_4$ are caused to occur. On the other hand, when discriminating circuit I produces no output signal, in other words, when at least one light measurement is already made, second signal $S_2$ is applied to first shift register AR and gate $G_{15}$ and exponent circuit 4, causing the $Ev$ value of AR to be applied to exponent circuit 4. FIG. 7 is a circuit diagram showing construction of discriminating circuit I. Using FIG. 7, the operation of discriminating circuit will be explained in detail. In FIG. 7, RN designates RN part of first memory register M1R of FIG. 1, $R_2$ designates register $R_2$ of FIG. 1, $G_{18}$ designates gate $G_{18}$ of FIG. 1, $IN_1$ designates an inverter connected to RA part of first memory register M1R, $AND_1$ designates an AND circuit connected to inverter $IN_1$, the output of $R_2$ and the output terminal $\overline{F_1}$ of T flip-flop TFF, $IN_2$ designates an inverter connected to the output terminal of $R_2$, $AND_2$ designates an AND circuit connected to inverter $IN_2$, RA part of first memory register M1R and the output terminal $\overline{F_1}$ of T flip-flop TFF, OR designates an OR gate connected to the outputs of AND circuits $AND_1$ and $AND_2$ and having an output connected to terminal T of T flip-flop, and RSFF designates a RS flip-flop having a "set" input terminal connected to the output of $AND_1$ and having a reset terminal connected to output terminal of $AND_2$. Now assuming that the value of RN part is zero, signal $S_1$ causes the values of register $R_2$ and RN part of M1R to be read out and to be transmitted to inverters $IN_1$ and $IN_2$ and AND circuits $AND_1$ $AND_2$. The output of AND circuit $AND_1$ is 1, and the output of $AND_2$ is 0, so that $F_2$ is set to 1 and TFF is inverted by the output of OR, thereby $\overline{F_1}$ becomes 0 to terminate comparison. (provided that TFF is in the state $F_1$ 0; $\overline{F_1}$ 1 by the reset pulse). As mentioned above, when no light measurement is previously made, $F_2$ of RSFF produces an output 1 which is applied to ROM device. When the content of RA part is more than 1, the state of RSFF remains unchanged, transmitting no signal to ROM device. As mentioned before, at the time when first signal $S_1$ occurs, the discrimination whether or not at least one light measurement is previously made is carried out. When no light measurement is made, the discriminating circuit I produces an output signal which is then applied through gate $G_{24}$ to ROM device, thereby signals $E_1$ through $E_4$ causes a light measurement of $Ev$ value. Now assuming that the discriminating circuit I produces no signal, in other words, at least one light measurement is previously made, signals $E_1$ through $E_4$ do not occur from ROM device, and instead signals $S_2$ and $S_3$ occur to perform computation of $2^{Ev}$ from the value $Ev$ of AR, which is transferred to second shift register BR. In other words, second signal $S_2$ is applied to first shift register AR and gate $G_{15}$ and gate $G_{26}$, causing the output of first shift register AR to be applied to exponent circuit 4. FIG. 8 is a circuit diagram showing exponent circuit 4, in which $R_6'$, $R_3$, $R_4$ are shift registers, $R_5$ is a counter, Ex is an exclusive OR gate, NOR is a NOR gate, $G_6'$ and AND are AND gates, IN is an inverter, and PG is a pulse generator. Second signal $S_2$ causes the content of AR to be transferred through gate $G_{15}$ to register $R_4$, thereby $Ev$ value is introduced into register $R_4$. Next signal $S_{21}$ is applied to pulse generator PG, causing pulse generator PG to produce a pulse train which is applied to counter $R_5$ and AND gate AND. To other input terminal of AND gate AND is applied the output of NOR through inverter IN and the output of NOR is 0, so that a shift pulse is applied to register $R_3$ through AND, causing the content of $R_3$ to be shifted in correspondence to the number of pulses from pulse generator PG. When the content of $R_5$ coincides with the content of $R_3$, $Ev$ number of shifts are effected. Also the digital value corresponding to 1 is transferred by second signal $S_2$ from $R_6$ to $R_3$, so that when the content of $R_3$ is shifted $Ev$ number of times, computation $2^{Ev}$ is effected. Third signal $E_3$ is applied to register $R_3$ of FIG. 9, register BR of FIG. 1 and gates $G_{21}$ and $G_{27}$, causing the content of $R_3$ to be transferred through gate $G_{21}$ to BR. Fourth signal $S_4$ is applied to registers M4R and AR, and gates $G_1$ and $G_{26}$, causing the A-value of M4R to be transferred through gate $G_1$ to AR. Fifth signal $S_5$ is applied to registers AR and CR and gates $G_3$ and $G_{28}$, causing the content of AR to be transferred through gates $G_{26}$ and $G_3$ to register CR. Sixth signal $S_6$ is applied to registers AR, BR and CR and gates $G_{13}$, $G_{14}$, $G_{20}$, $G_{27}$, $G_{26}$, $G_{28}$ and $G_{32}$, causing the content of BR and the content of CR to be applied to divider 3, causing the output of divider which is representative of $2^{Ev}/A$ to be applied through $G_{20}$ to AR, and causing A-value of CR to be again transferred through gate $G_{32}$ to CR. Seventh signal $S_7$ is applied to AR, BR, $G_2$ and $G_{27}$, causing the content of AR to be transferred through gates $G_{26}$ and $G_2$ to BR. Eighth signal $S_8$ is applied to registers AR, BR and CR and gates $G_{13}$, $G_{14}$, $G_{20}$, $G_{26}$, $G_{27}$ and $G_{28}$, thereby computation based on the formula $BR/CR = 2^{Ev}/A^2 = 1/T$ is performed and $1/T$ is transferred in a manner similar to that of signal $S_6$. Ninth signal $S_9$ is applied to registers AR and $R_2$ and gates $G_{19}$, $G_{26}$, $G_{31}$, $G_2'$ and $G_4'$, causing $1/T$ of AR to be applied to discriminating circuit I through gate $G_{19}$ and to be again to AR through gate $G_{31}$. To I is also applied a digital value corresponding to 1 of $R_2$, thereby the above mentioned discrimination is performed in the discriminating circuit of FIG. 7. When $1/T > 1$, $F_2$ of RSFF produces an output 1, while when $1/T \leq 1$, it produces an output 0. Tenth signal $S_{10}$ is applied to register AR and gates $G_{25}$, $G_{26}$ and $G_{31}$, causing the content of AR to be displayed by display device DS through gates $G_{25}$ and $G_{33}$ when $1/T > 1$ or through gates $G_{25}$ and $G_{34}$ and inverter IN and reciprocal number circuit 6, when $1/T \leq 1$ and causing the content of AR to be again introduced to AR through gate $G_{31}$.

Figure 10:
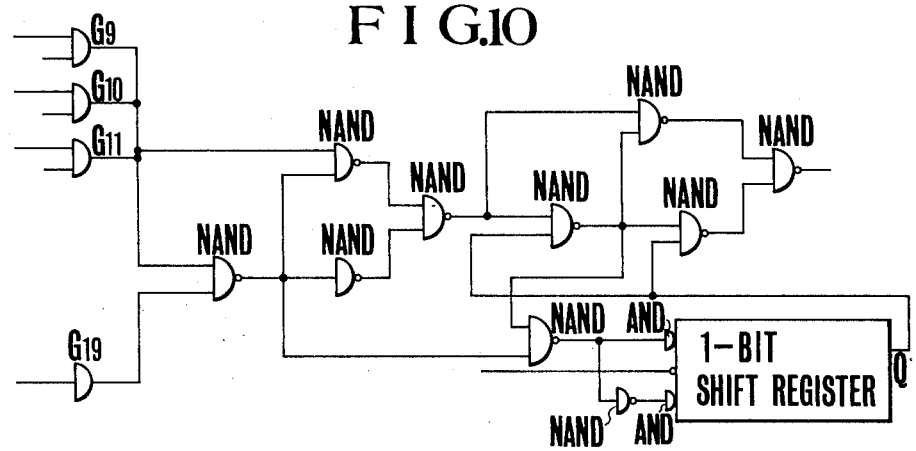
FIG. 10 is a schematic circuit diagram, in partially in block form, of an adder 2 of FIG. 1.
Figure 11:
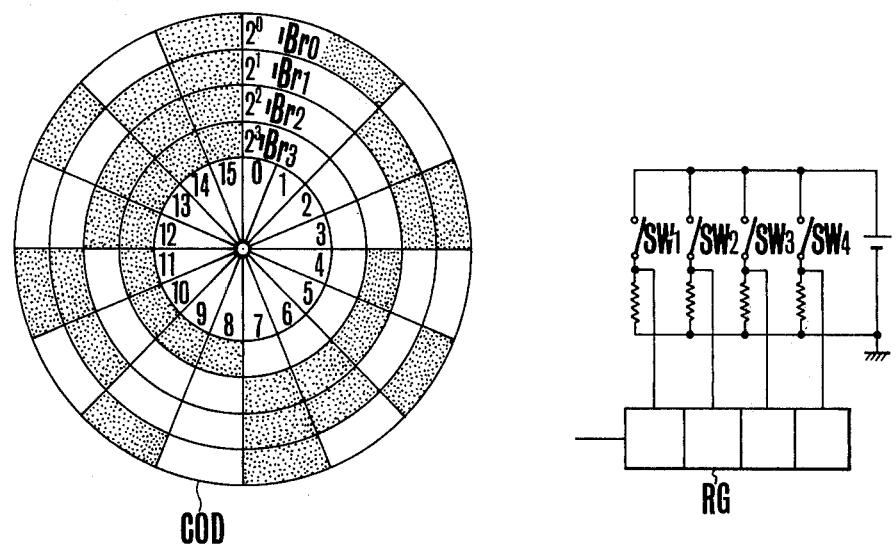
FIG. 11 is a schematic circuit diagram of a film sensitivity setter.

For making an aperture value determination, a desired shutter time is set into the meter by operating certain of digit keys 0 through 9 and a decimal point key of FIG. 3, and then key T is pushed down, thereby gate $G_7$ is gated on, and the desired shutter time is introduced to memory register M3R and stored therein. Next, key A is pushed down to select the aperture value computation program of FIG. 9 for cooperation with ROM device. When signal $S_1$ occurs, the content of RN part of M1R is compared with 1. When no light measurement is previously made, signals $E_1$ through $E_4$ occur, causing Ev value to be introduced to AR. When at least one light measurement was made, signals $S_2$ and $S_3$ occur causing $2^{Ev}$ to be introduced to BR. Next, first signal $A_1$ is applied to M3R, AR and gates $G_1$ and $G_{26}$, causing the content of M3R to be transferred to AR through gate $G_1$. Second signal $A_2$ is applied to registers AR and CR and gates $G_3$ and $G_{28}$, causing T value to be introduced from AR to CR through gates $G_{26}$ and $G_3$. Third signal A is applied to registers BR and CR and gates $G_{16}$, $G_{17}$, $G_{20}$, $G_{26}$, $G_{27}$ and $G_{28}$ causing the outputs of BR and CR to be applied to multiplier 5 through gates $G_{16}$ and $G_{17}$, and causing the output of multiplier 5 to be applied through gate $G_{20}$ to AR. Fourth signal $A_4$ is applied to register AR, and gates $G_8$, $G_{20}$ and $G_{26}$, causing the output of AR with a magnitude representative of $2^{Ev} \times T$ to be applied through gate $G_8$ to root circuit 1 and then causing the output of root circuit 1 with a magnitude representative of $\sqrt{2^{Ev} \times T}$ to be applied through gate $G_{20}$ to AR. Fifth signal $A_5$ is applied to register AR and gates $G_{26}$, $G_{33}$ and $G_{31}$ causing the content of AR which represents the square-root of $2^{Ev} \times T (=A)$ to be displayed. FIG. 10 is a circuit diagram of adder 2 of FIG. 1 of which input terminals are connected to the gates $G_9$ through $G_{12}$ of FIG. 1, and which is constructed from NAND gate, AND gates and a 1-bit shift register. FIG. 11 shows an example of the construction of the film speed setter Sv of FIG. 1. The setter Sv has a code plate COD and a number of brushes $Br_0$ through $Br_3$ arranged in movably contacting relation with the code plate COD at the conductance patterns thereof to constitute the corresponding number of switches $SW_1$ through $SW_4$ when switch DIN of FIG. 3 is turned on. Using the code plate COD, a desired film speed can be set into a register RG in the digital form. FIG. 12 is an example of the reciprocal number circuit 6 of FIG. 1 as comprising a divider having two input terminals, one of which is connected to the above mentioned gate $G_{34}$ and the other of which is connected to the input terminal of a register SR having a digital value corresponding to 1. Responsive to an input from gate $G_{34}$, the divider produces an output with a magnitude representative of the reciprocal number of the input from gate $G_{34}$. FIG. 13 shows an example of each of the shift registers AR, BR, CR, M1R, M3R, M4R, $R_1$ and $R_2$ of FIG. 1 as comprising four JK flip-flop FF, an inverter IN and an AND gate AND having two input terminals one of which is connected to the clock pulse generator and the other of which is connected to ROM device.

As described above, the digital exposure meter of the invention is constructed from a digital electrical circuits which may be integrated and enables the operator to select various functions of operation, thereby the capabilities of the exposure meter are broadened.

What is claimed is:

1. A digital exposure meter comprising:
   a. a first conversion means for converting the value of the intensity of light into a first digital signal;
   b. a second conversion means for converting the value of an exposure factor into a second digital signal;
   c. a plurality of register means, at least two of said register means being connected with each other and each having a first transfer gate through which the content of each said register means is transferred from one to another;
   d. applying means for applying said first and said second digital signals from said first and second conversion means to said register means;
   e. a computing circuit, said computing circuit including at least addition-computing means having addition function and division-computing means having division function, and each of said computing means being connected to at least two of said plurality of register means through input gates and having a second transfer gate through which the output of said computing means is transferred to said register means;
   f. sequence control means connected to said first transfer and said second transfer gates and input gates for generating control signals in sequence which are selectively applied to said gates to control the gating operation of each of said gates;
   g. regulating means for regulating transmission of said control signals to said gates in predetermined sequential relation; and
   h. display means connected to at least one of said register means for displaying the content of said register means.

2. A digital exposure meter comprising:
   a. a first conversion means for converting the value of the intensity of light into a first digital value proportional to the logarithm of the light intensity;

b. a second conversion means for converting the value of film speed to be set into a second digital value proportional to the logarithm of the film speed value;

c. adder means connected to said first conversion means and said second conversion means for adding the first digital value and second digital value, thereby said adder means provides an exposure value (Ev value) which is a sum of said first digital value proportional to the logarithm of the light intensity and said second digital value proportional to the logarithm of the film speed value;

d. a fourth conversion means for converting the shutter time value (T value) to be set into a fourth digital value;

e. exponent means connected to said adder means for producing a $2^{Ev}$ value based on said exposure value (Ev value) produced by said adder means;

f. multiplier means connected to said fourth conversion means and said exponent means for multiplying said $2^{Ev}$ by said fourth digital value so as to produce a $2^{Ev} \times T$ value; and g. root means connected to said multiplier means for computing the square-root of said $2^{Ev} \times T$ value.

3. A digital exposure meter comprising:

a. a first conversion means for converting the value of the intensity of light to be photographed into a first digital value proportional to the value of light intensity;

b. exposure information input means for setting digital values corresponding to exposure informations such as film sensitivity information, diaphragm value information and shutter time information;

c. operation mode selecting means for selection of operation modes such as aperture value computing mode, shutter time computing mode, exposure value computing mode and average exposure value computing mode;

d. sequence control signal generating means for generating a train of control signals in a manner based on the operation mode selected by said operation mode selecting means;

e. an exposure computing circuit connected to said first conversion means, said exposure information input means and said sequence control signal generating means upon response to a control signal from said sequence control signal generating means for performing a computation; and f. display means for displaying the output of said exposure computing circuit.

4. A digital exposure calculator including:

a. keyboard input means having a plurality of numeric keys manually operable for entering numerical data into the calculator and having a plurality of non-numeric control keys manually operable for controlling the calculator, said non-numeric control keys including a plurality of keys for exposure computation mode selection associated with a plurality of exposure computation programs, said exposure computation programs each having a series of computation operations;

b. storage means coupled to said keyboard input means for storing numerical data entered into or calculated by the calculator;

c. processing means for processing said numerical data in accordance with the exposure computation program selected by said exposure computation keys; and d. display means connected to said storage means for displaying the output of said processing means as a result of computation.

5. A digital exposure meter comprising:

a. a first conversion means for converting the value of the intensity of light into a first digital value proportional to the logarithm of the light intensity;

b. a second conversion means for converting the value of film speed to be set into a second digital value proportional to the logarithm of the film speed value;

c. adder means connected to said first conversion means and said second conversion means for adding the first digital value and second digital value provides an exposure value (Ev value) which is a sum of said first digital value proportional to the logarithm of the light intensity and said second digital value proportional to the logarithm of the film speed value;

d. a third conversion means for converting the aperture value (A value) to be set into a third digital value;

e. exponent means connected to said adder means for producing a $2^{Ev}$ value based on said exposure (Ev) value produced by said adder means;

f. divider means connected to said exponent means and said third conversion means for dividing said $2^{Ev}$ value by said third digital value so as to produce a $2^{Ev}/A^2$ value, whereby the computation of $2^{Ev}/A^2 = 1/T$ is resulted.

6. A digital exposure meter according to claim 5, wherein said divider means is provided with discriminating means for comparing the output value $1/T$ with 1 and with reciprocal number means responsive to the output of said discriminating means for computing the reciprocal number of $1/T$, whereby when $1/T<1$, said discriminating means produces an output signal which renders operative said reciprocal number means.

7. A digital exposure meter comprising:

a. a first conversion means for converting the value of the intensity of light into a first digital value proportional to the logarithm of the light intensity;

b. a second conversion means for converting the value of film speed to be set into a second digital value proportional to the logarithm of the film speed value;

c. adder means connected to said first conversion means and said second conversion means for adding the first digital value and second digital value, thereby said adder means providing an exposure value (Ev value) which is a sum of said first digital value proportional to the logarithm of the light intensity and said second digital value proportional to the logarithm of the film speed value;

d. exposure value computation number detecting means for detecting the number of exposure value computations repeated, said detecting means being capable of memorizing the number of exposure values (Ev values) produced from said adder means;

e. summing means for summing up all of the Ev values produced from said adder means; and f. divider means connected to said exposure value computation mumber detecting means and to said Ev value summing means for dividing the sum of the Ev values by the number of computations repeated so as to produce an average exposure (Ev) value.

8. A digital exposure meter according to claim 7, wherein said exposure value computation number detecting means is provided with second adder means for adding a digital value corresponding to 1 each time said adder means produces an Ev value.

9. A digital exposure meter according to claim 7, wherein said Ev value summing means is provided with third adder means for adding an Ev value produced from said adder means each time the Ev value is produced.

* * * * *